United States Patent [19]

Barrillon et al.

[11] Patent Number: 5,245,115
[45] Date of Patent: Sep. 14, 1993

[54] PROCESS FOR THE THERMAL SHOCK TREATMENT OF SPENT POT LININGS OBTAINED FROM HALL-HEROULT ELECTROLYTIC CELLS

[75] Inventors: Eric Barrillon, Meylan; Pierre Personnet, Saint-Jean-de-Maurienne; Jean-Claude Bontron, Aix-en-Provence, all of France

[73] Assignee: Aluminium Pechiney, Courbevoie, France

[21] Appl. No.: 716,104

[22] Filed: Jun. 17, 1991

[30] Foreign Application Priority Data

Jul. 4, 1990 [FR] France .................... 90 09174

[51] Int. Cl.$^5$ .............. B09B 3/00; A62D 3/00; C01F 1/00
[52] U.S. Cl. .................... 588/248; 423/111; 423/DIG. 20; 423/130; 110/345; 588/900
[58] Field of Search ............ 423/659, 111, DIG. 20, 423/130; 588/248, 900; 110/345

[56] References Cited

U.S. PATENT DOCUMENTS

| | | | |
|---|---|---|---|
| 4,158,701 | 6/1979 | Anderson et al. | 423/111 |
| 4,735,784 | 4/1988 | Davis et al. | 423/111 |
| 4,763,585 | 8/1988 | Rickman | 110/345 |
| 4,973,464 | 11/1990 | Rickman | 423/DIG. 20 |
| 4,993,323 | 2/1991 | Tabery et al. | 110/346 |
| 5,024,822 | 6/1991 | Hittner et al. | 106/705 |
| 5,143,001 | 9/1992 | Eriksson | 110/345 |
| 5,164,174 | 11/1992 | Bawken et al. | 423/484 |

OTHER PUBLICATIONS

Ogden Environmental Services, Phase 2 Development Program for the Circulating Bed Combustion of Spent Potliners, Sep. 1987.

*Primary Examiner*—Gary P. Straub
*Attorney, Agent, or Firm*—Dennison, Meserole, Pollack & Scheiner

[57] ABSTRACT

The invention relates to a thermal shock treatment in a reactor of ground spent pot linings, constituted both by carbon-containing products and silico-aluminous products impregnated with fluorine-containing mineral compounds, mixed with a pulverulent mineral additive able to combine hot, with or without melting or fusion, with the fluorine-containing impregnating compounds in order to form new stable and insoluble compounds such as $CaF_2$, binary, ternary or quaternary compounds of NaF, $CaF_2$, $SiO_2$, $Al_2O_3$, $CaSO_4$, $Na_2SO_4$, of the nephelite, hauynite or similar type.

16 Claims, 1 Drawing Sheet

PROCESS FOR THE THERMAL SHOCK TREATMENT OF SPENT POT LININGS OBTAINED FROM HALL-HEROULT ELECTROLYTIC CELLS

BACKGROUND OF THE INVENTION

FIELD OF THE INVENTION

The invention relates to a process for the thermal shock treatment in a reactor of spent pot linings, resulting more particularly from the dismanting of cells for the production of aluminium by electrolysis according to the Hall-Heroult method. It is pointed out that an aluminium production plant with a capacity of 240,000 t/year produces approximately 4,000 t/year of spent pot linings, which are constituted by carbon-containing cathode blocks, joints and lateral linings made from carbon-containing waste, as well as refractories and insulants on the side walls and bottom of the metal chamber forming the electrolytic cell. After use, these lining products are highly impregnated with noxious materials, such as soluble hexafluoroaluminate or sodium fluorides, as well as cyanides, which must be rendered insoluble or destroyed before they are discharged or reused.

STATE OF THE ART

Processes for the treatment of old or spent pot linings by the wet method have already been described and involve grinding followed by leaching using e.g. an alkaline solution, cf. the Aluminium Pechiney U.S. Pat. No. 4,052,288 or the Kaiser U.S. Pat. No. 4,113,831.

These processes, which involve the use of large-scale equipment, are limited to a single treatment of the carbon-containing parts of the pot linings, which should be separated beforehand from the non-carbon-containing parts formed by the refractories and insulants.

Thermal treatment processes are also known, which generally use a fluidized bed and which are either based on a pyrohydrolysis at more than 1000° C. of the spent pot linings in accordance with the Elkem U.S. Pat. No. 4,065,551, or the Kaiser U.S. Pat. Nos. 4,113,832 and 4,116,809, or combustion in air or in an oxidizing atmosphere of the carbon-containing elements at a temperature of approximately 800° C., which is sufficient for decomposing the cyanides without leading to any significant giving off of volatile fluorine-containing compounds in accordance with the Reynolds U.S. Pat. No. 4,053,375 or the article by L. C. Blayden and S. G. Epstein, Journal of Metals, July 1984, p 24.

All processes and apparatuses based on the thermal procedure are limited with respect to their possibilities by the nature and composition of the pot linings to be treated. Thus, due to the melting or fusion of certain eutectic compounds forming during combustion, the particles of the pot linings have a high tendency to agglomerate. It rapidly becomes impossible to avoid their agglomeration and consequently to maintain a fluidized bed and a fortiori a dense bed if combustion is e.g. carried out in a rotary furnace with a long residence time. This agglomeration phenomenon which is already significant in the case of pot linings charges constituted solely by carbon-containing products is greatly accentuated in the case of charges containing refractory oxides and in particular silica, whose weight content must not exceed 3 or 4%, as can be gathered from the article by E. R. Cutshall and L. O. Daley, Journal of Metals, November 1986, p 37, table II.

The variant consisting of carrying out the combustion in a circulating fluidized bed reactor as described in "Technical Paper", No. A 87-14, The Metallurgical Society of AIME, p 3, 1987, AIME Annual Meeting, or the Ogden U.S. Pat. No. 4,763,585 makes it easier to control the agglomeration problem. Thus, in U.S. Pat. No. 4,763,585 carbon-containing pot linings mixed with an additive constituted by finely ground refractory oxides are placed in a circulating fluidized bed reactor. This additive must remain inert during combustion, i.e. must neither react, nor melt in contact with the carbon-containing waste in the generally chosen temperature range between 760° and 1200° C. As a function of the size of the ground oxide particles, the residence time in the reactor can vary between a few seconds and one hour. The coating of the carbon-containing pot linings particles by the pulverulent refractory additive prevents the surface sticking together of the particles during combustion in air. However, here again, the problem of agglomeration is only solved to the extent that treatment takes place of carbon-containing pot linings or at least those obtained from linings with a very low silica content, i.e. essentially based on alumina, whose life is well below that of modern, preshaped silico-aluminous linings.

Knowing that these spent pot lining contain significant quantities of fluorine-containing derivatives (up to 200 kg of fluorine per tonne), sodium products (up to 200 kg of Na per tonne) non-negligible quantities of cyanides (up to 10 kg per tonne) and that these environmentally noxious elements are encountered both in the carbon-containing part of the inner lining of the electrolytic cell and in the part of the silico-aluminous brickwork constituting the thermal insulating lining of modern cells, it has proved necessary to conceive an industrial process able to treat spent pot lining under economic conditions, no matter what their silica content and which offers complete security for the environment, i.e. ensuring during the treatment a total decomposition of the cyanides and a virtually complete insolubilization of the fluorides.

SUMMARY OF THE INVENTION

The process according to the invention consists of fiercely heating for a very short time the spent pot lining at a temperature adequate to permit the decomposition of the cyanides and preferably in the presence of a reactive pulverulent additive, i.e. able to chemically combine with the fluorine-containing products impregnating the pot lining, in order to form stable and insoluble compounds such as $CaF_2$, binary, ternary or quaternary compounds of $NaF$, $CaF_2$, $CaO$, $SiO_2$, $Al_2O_3$, $CaSO_4$, $Na_2SO_4$, of the nephelite, hauynite or similar type.

More specifically, the present invention relates to a process for the heat treatment, after grinding, of spent pot lining more particularly obtained from Hall-Heroult electrolytic cells and in the presence of a pulverulent additive, characterized in that:

an intimate mixing takes place of the ground pot lining constituted both by carbon-containing products and silico-aluminous products impregnated with fluorine-containing mineral compounds, and a mineral additive able to combine hot, with or without fusion, with the fluorine-containing impregnation compounds in order to form new stable and insoluble compounds;

said mixture is injected into a gas flow circulating in the upper part of a reactor at a temperature T between 1100° and 1800° C.;

the contact time of the solid particles of the mixture with the circulating gas flow is regulated in such a way that said particles reach a temperature t of at least 750° C. prior to their extraction at the base of the reactor with the gas flow;

the gas flow temperature, measured at the base of the reactor, is maintained at a desired value To such that $T > T_o \geq t$, e.g. by adjusting the weight flow rate of the pulverulent mixture injected into the gas flow at temperature T or by adjusting the combustible gas flow rate conditioning the temperature T of the gas flow with a constant pulverulent mixture flow rate; and, after cooling, at the reactor outlet, the gas flow is separated from the solid particles then constituting an insoluble residue.

Thus, during tests carried out with a view to developing a thermal process for the neutralization of the polluting agents contained in spent pot linings and with in particular the destruction of the cyanides (up to 1% by weight) and the insolubilization of the fluorine-containing compounds (up to 20% by weight fluorine), mainly alkali metal and alkaline earth fluorides such as, $NaF_2$ and $CaF_2$, and also $AlF_3$, it was confirmed that the main difficulty was the prevention of this agglomeration phenomenon, which is particularly sensitive when the spent pot lining contain sodium and silicon (generally as $SiO_2$), whose weight contents can respectively reach 20 and 25%.

The essential characteristic of the process according to the invention is based on the finding that it is possible to carry out, without any agglomeration of the spent pot lining charge due to possible melting or fusion of the particles, the depollution reactions consisting of destroying the cyanides and rendering insoluble the fluorine-containing impregnation compounds by chemical recombination and in particular with the additive. This is achieved by creating a thermal or heat shock on the solid particles of the mixture brought suddenly into contact during a very short time of approximately 0.3 to 3 seconds, with a gas flow at a temperature T preferably fixed at between 1200° and 1700° C. The hot gas flow is the product of the combustion of a fuel gas such as methane, butane or natural gas, in the presence of air, oxygen or a mixture thereof. The thus created thermal shock permits the decomposition of the cyanides and the quasi-instantaneous recombination of the fluorine-containing impregnating agents, whilst the temperature in the solid particles remains below that of the gas flow and generally between 800° and 1200° C. The softening of the solid particles by partial melting, linked with the formation of fusible eutectic compounds, is not prejudicial provided that any prolonged contact or sticking between the particles is prevented by ensuring adequate stirring or agitation in the reaction chamber. This is obtained by regulating the speed of the gas flow to an adequate value and at least 1 m/second at the treatment temperature in question.

In addition to the temperature T and the speed of the gas flow conditioned by regulating the fuel and combustion supporting gas flow rates, it is also appropriate to fix the average residence time of the particles in the reaction chamber. The adopted range of 0.3 to 3 seconds is the best compromise for an effective treatment of pot lining having widely differing compositions within the acceptable maximum content limits ($Na \leq 20\%$ and $Si \leq 25\%$), requiring a heating of the particles of the mixture to at least 750° C. and preferably to between 800° and 1200° C., in order to ensure adequate kinetics of the recombination reactions without causing a marked melting of the particles with the risk of agglomeration. The residence time of the particles is not only a function of the speed of the circulating gas flow, but also more technological parameters such as the dimensions of the generally conical or cylindroconical reaction chamber, as well as the trajectory of the circulating gas flow linked with the injection method chosen, i.e. the injector characteristics.

The adaptation of the characteristics of the mixture and in particular its composition and grain size is also essential for performing the process. Thus, the spent pot lining are ground in order to obtain particles with a size smaller than 5 mm and preferably smaller than 2 mm. In addition, the pulverulent mineral additives mixed with the ground pot lining in a weight proportion of 0 to 50% of the final mixture and able to chemically combine with the impregnation products, particularly with the fluorides in order to form stable and insoluble compounds, is preferably kaolin, anhydrous $CaSO_4$, lime or a mixture thereof and which constitute readily available inexpensive reactive materials. In order to increase the reactivity of the pulverulent additive of grain size between 0 and 1 mm, it is appropriate to intimately mix it with ground pot lining and an advantageous variant with respect to the preparation of the mixture can consist of introducing the additive into the coarsely ground pot lining and to complete the grinding on the mixture until the requisite grain size for the pot lining particles is obtained.

All these parameters have been examined and fixed by experiment and it has proved necessary during the performance of the invention to be able to continuously and accurately check the heat treatment of large quantities of spent pot linings ensuring a very reliable and operationally flexible process on an industrial scale. By means of a solid matter/gas flow exchanger system between the reactor inlet and outlet to stabilize the reactor operating conditions by maintaining a desired value To for the temperature of the gas flow measured prior to its discharge from the reaction chamber in the lower part of the reactor. For this purpose, it is sufficient to modify as a function of the temperature variations compared with the desired temperature To, either the weight flow rate of the pulverulent mixture injected into the reactor, or the temperature of the gas flow in the upper part of the reactor by regulating the fuel gas flow rate. These procedures for continuously checking and regulating the heat treatment of the spent pot lining are only effective if the equipment used and in particular the reactor with its injector are appropriately adapted, as is the case with the apparatus produced by VICARB and used for performing the preferred version of the process.

Finally, the gas flow charged with solid particles is extracted from the bottom of the reactor where, after cooling, the gas flow is separated from the solid particles forming an insoluble residue, whilst the dust-freed gas flow is discharged into the atmosphere after collecting the small amount of fluorine-containing gases contained therein.

The efficiency of the insolubilization treatment is checked by taking samples from the residue and leaching according to French standard X31-210. The CN and F dosings take place on the leaching liquors, the solubilized fluorine and cyanide contents related to the weight of the residue having to remain below respectively 0.01 and 0.05 to 0.3% as a function of the national standards in force.

DESCRIPTION OF THE PREFERRED EMBODIMENTS

Figure 1:
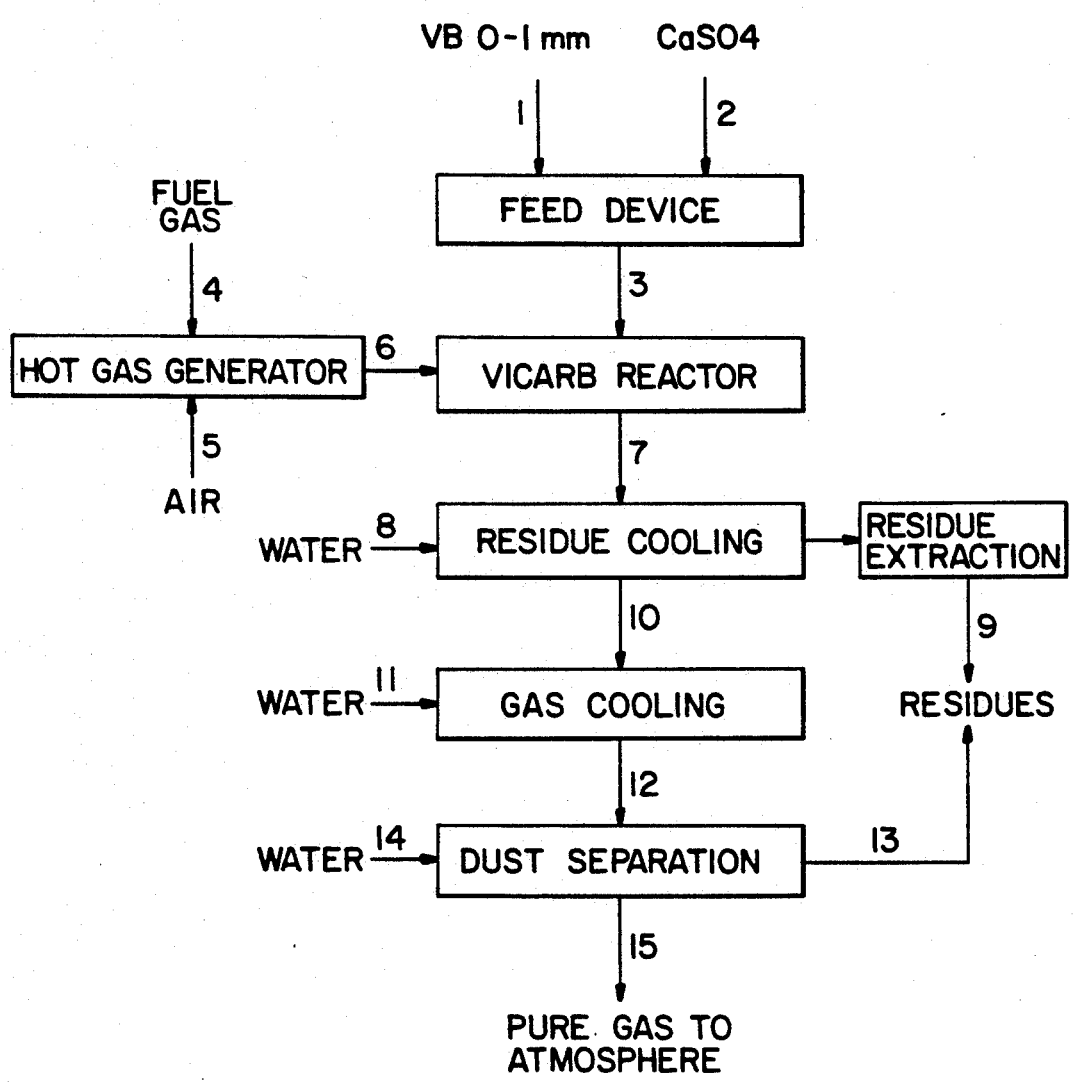
FIG. 1 is a flow chart describing the performance of a preferred embodiment of the invention.

The pulverulent mixture containing at least 50% by weight of ground pot lining (1) of grain size 0 to 1 mm and to which has been added anhydrous $CaSO_4$ (2) or kaolin or lime or a mixture thereof, is extracted from the base of a storage hopper by a conveyor-screw dosing device having a variable rotation speed. This screw dosing device is connected (3) to the upper part of a VICARB-type cylindrical reactor equipped with a gas injector and in accordance with the patented model (EP 0 171 316), serving as a generator of the gas flow at a temperature T which is preferably between 1200° and 1700° C. by regulating the combustion of the mixture of fuel gas (4) and air (5). In addition, the pulverulent mixture, whose flow rate in the present case can vary as a result of the regulatable speed screw dosing device between 50 and 300 kg/hour, must form with the gas flow a suspension, whose concentration is between 0.1 and 1.5 $kg/Nm^3$ and is preferably between 0.15 and 1 $kg/Nm^3$ ($Nm^3$ = normal cubic meter; $m^3$ at 20° C., 760 mm Hg).

The dosed pulverulent mixture (3) is injected into the centre of a vortex formed by the hot gas flow (6) arriving tangentially at the top of the cylindrical reaction chamber and which is given a whirling movement. In order to obtain a good dispersion of the mixture particles in the gas flow and a good stirring action, the speed of the flow is regulated to 6 m/second and, taking account of the dimensions of the reaction chamber (diameter 0.25 m and height 3 m), the corresponding residence time is 0.5 sec. As a function of the temperature T chosen at the reactor inlet and which is generally between 1200° and 1700° C. and for an average residence time of approximately 0.5 sec for the solid particles, whose weight flow rate can vary between 50 and 300 kg/h, a temperature is obtained of at least 750° C. and generally between 800° and 1200° C. for the solid particles prior to their discharge from the reactor and cooling. The parallel checking of the gas flow temperature To measured in the same zone shows that To varies like t between 800° and 1200° C. as a function of the high thermal operating conditions chosen and in accordance with the relation $T > To \geq t$. Once the value of To is e.g. fixed at 850° C., the variations of the temperature $\Delta T$ compared with this reference value are corrected by adapting the flow rate of the pulverulent material injected by means of the feed screw to a variable rotation speed dependent on a device for measuring and recording temperature variations greater than +5° C. compared with the reference temperature To=850° C.

To limit the risk of the particles sticking to the inner wall of the cylindrical reaction chamber, whose temperature can locally exceed 1200° C., it is advantageous to cool these walls, e.g. by an air scavenging of the outer wall.

On leaving the reactor, the gas flow (7) is separated from the solid particles, which are cooled and trapped and drop into a water retention tank (8) placed beneath the reactor in the extension of the reaction chamber. A first solid residue is obtained after extraction from the tank. The gas flow (10) is channelled towards a water vaporization cooling device (11), where it is cooled (12) to approximately 70° to 80° C. prior to entering a water trickling filter (17) in order to have the dust (13) removed and this constitutes a second solid residue, prior to discharge into the atmosphere (15).

The two solid residues resulting from the double gas/solid separation associated with a double cooling are mixed and the final residue undergoes a depollution control, namely a check of the CN and F contents on the basis of residue samples removed and leached according to French standard X31-210.

EXAMPLES

Four compositions of homogeneous 1000 kg mixtures with a grain size of 0 to 1 mm were prepared using ground pot lining with the following weight contents:

| | |
|---|---|
| Na % = 14.0 | F % = 9.14 |
| Si % = 11.0 | CN % = 0.08 |

These pot lining were successively mixed with the following additives:

| | |
|---|---|
| Example 1 | anhydrous $CaSO_4$ (anhydrite) |
| Example 2 | lime |
| Example 3 | kaolin + anhydrous $CaSO_4$ |
| Example 4 | No additive |

The main operating characteristics and the results of the depollution tests are given in the following table.

TABLE 1

| | | EXAMPLES No. | | | |
|---|---|---|---|---|---|
| | | 1 | 2 | 3 | 4 |
| Initial total mixture whereof: | kg | 1000 | 1000 | 1000 | 1000 |
| old pot lining | kg | 600 | 600 | 500 | 1000 |
| additive: anhydrous $CaSO_4$ | kg | 400 | 0 | 100 | 0 |
| kaolin | kg | 0 | 0 | 400 | 0 |
| lime | kg | 0 | 400 | 0 | 0 |
| Heat treatment | | | | | |
| Mixture flow rate | kg/h | 136.4 | 214.3 | 107.1 | 54.5 |
| Gas flow temperature | °C. | | | | |
| high | T | 1400 | 1500 | 1400 | 1600 |
| low | To | 850 | 850 | 850 | 1200 |
| Gas flow speed | m/s | 6 | 6 | 6 | 8 |
| Average residence time in sec. | | 0.5 | 0.5 | 0.5 | 0.35 |
| Depollution rate of residue | | | | | |
| Appearance | | powder | powder | powder | powder |
| Total leachable CN | % | <0.01 | <0.01 | <0.01 | <0.01 |
| Total leachable F | % | 0.05 | 0.17 | 0.41 | 0.31 |

There is an excellent depollution rate of the residue with the mixtures using in particular anhydrous $CaSO_4$ and CaO as additives under industrial heat treatment conditions.

What is claimed is:

1. A process for heat treating spent pot linings obtained from Hall-Heroult electrolytic cells and comprising carbon and silico-aluminous materials impregnated with fluorides, comprising the steps of:

grinding said spent pot linings to a particle size less than 5 mm;

forming an intimate mixture of said ground spent pot linings and a pulverulent mineral additive of particle size less than 1 mm selected form the group consisting of anhydrous $CaSO_4$, $CaO$ and mixtures thereof;

injecting said intimate mixture into the center of a vortex formed by a flow of circulating hot gas arriving tangentially at the top part of a reactor at a temperature T between 1100° and 1800° C. and having a whirling movement;

contacting said injected intimate mixture with said circulating hot gas to form a suspension of concentration between 0.1 and 1.5 $Kg/Nm^3$;

extracting said suspension from a bottom part of the reactor at a temperature t between 800° and 1200° C. after a contact time between said injected intimate mixture and said circulating hot gas of 0.3 to 3 seconds;

maintaining the gas flow at the bottom of said reactor at a temperature $T_0$ such that $T > T_0 \geq t$;

cooling said extracted suspension; and separating the gas flow of said cooled extracted suspension from solid particles of insoluble residue contained therein.

2. Process of claim 1 wherein said fluorides are alkali metal and alkaline earth metal fluorides.

3. Process according to claim 1, wherein in said spent pot linings, the maximum weight contents of fluorine, cyanide, silicon and sodium are respectively 20, 1, 25 and 20%.

4. Process according to claim 1, wherein the spent pot linings particles are smaller than 2 mm.

5. Process according to claim 1, wherein the additive weight proportion in the intimate mixture is no more than 50%.

6. Process according to claim 1, wherein the temperature T is fixed at between 1200° and 1700° C.

7. Process according to claim 1 or 6, wherein the gas flow at temperature T circulates at a speed of at least 1 m/sec.

8. Process according to claim 1, wherein the suspension has a concentration between 0.15 and 1 $kg/Nm^3$.

9. Process according to claim 1, wherein temperature To is between 800° and 1200° C.

10. Process according to claim 1 or 9, wherein temperature To is maintained by adjusting the weight flow rate of the pulverulent mixture injected into the gas flow at temperature T.

11. Process according to claim 10, wherein the pulverulent mixture weight flow rate is controlled by varying the speed of a feed screw injecting said mixture.

12. Process according to claim 1, wherein said fluorides are selected from the group consisting of NaF, $CaF_2$, $AlF_3$ and mixtures thereof.

13. Process according to claim 1, wherein said hot gas is a product of combustion of a fuel gas.

14. Process according to claim 13, wherein temperature To is maintained by controlled flow of the fuel gas.

15. Process according to claim 1, wherein said separated gas flow is subjected to an additional cooling and additional separation of solid particles therefrom.

16. Process according to claim 15, wherein the solid particles of said additional separation are combined with the solid particles from said step of separating the gas flow.

* * * * *